United States Patent
Isaksson

[11] Patent Number: 6,146,065
[45] Date of Patent: Nov. 14, 2000

[54] CUTTING INSERT FOR A BAR PEELING OPERATION

[75] Inventor: Robert Isaksson, Järbo, Sweden

[73] Assignee: Sandvik Aktiebolag, Sandviken, Sweden

[21] Appl. No.: 09/301,457

[22] Filed: Apr. 29, 1999

[30] Foreign Application Priority Data

Apr. 29, 1998 [SE] Sweden ................................ 9801501

[51] Int. Cl.[7] .......................... B23B 27/22; B23P 15/28
[52] U.S. Cl. ............................................ 407/114; 407/113
[58] Field of Search .......................... 407/113–116, 117, 407/114

[56] References Cited

U.S. PATENT DOCUMENTS

| | | | |
|---|---|---|---|
| D. 305,662 | 1/1990 | Niebauer | 407/113 |
| 3,621,549 | 11/1971 | Billups | 407/113 |
| 3,777,341 | 12/1973 | Faber | 407/114 |
| 4,556,345 | 12/1985 | Phillipi | 407/114 |
| 4,616,962 | 10/1986 | Ushijima et al. | 407/113 |
| 4,631,994 | 12/1986 | Jester et al. | |
| 4,674,924 | 6/1987 | Carlsson et al. | 407/114 |
| 4,681,487 | 7/1987 | Pettersson | 407/114 |
| 4,755,086 | 7/1988 | Stashko | 407/114 |
| 4,941,780 | 7/1990 | Takahashi | 407/114 |
| 4,993,892 | 2/1991 | Takahashi | 407/114 |
| 5,082,401 | 1/1992 | Niebauer | 407/114 |
| 5,192,171 | 3/1993 | Ther et al. | 407/114 |
| 5,246,315 | 9/1993 | Hansson et al. | 407/114 |
| 5,599,141 | 2/1997 | Katbi et al. | 407/114 |
| 5,779,401 | 7/1998 | Stallwitz et al. | 407/114 |
| 5,897,272 | 4/1999 | Wiman et al. | 407/114 |

FOREIGN PATENT DOCUMENTS 35 40 665  5/1987  Germany .

*Primary Examiner*—A. L. Wellington
*Assistant Examiner*—Erica Ergenbright
*Attorney, Agent, or Firm*—Burns, Doane, Swecker & Mathis, L.L.P.

[57] ABSTRACT

A cutting insert enables the use of one single type of insert to achieve close tolerances and good surface finish in a bar peeling tool. The insert includes convexly curved corners, between which are disposed flat interconnecting surfaces. The chip face has an elevated plateau, portions of which extend to respective corners. On one side of a bisector of the corner, the plateau section is of concave shape, and on the other side of the bisector the plateau section is of convex shape.

15 Claims, 2 Drawing Sheets

CUTTING INSERT FOR A BAR PEELING OPERATION

BACKGROUND OF THE INVENTION

The present invention relates to a cutting insert for a bar peeling operation performed in bars formed of stainless steel or other heat resistant materials wherein the insert has a polygonal form including an upper chip face, an opposite bottom face and a clearance face located therebetween, whereby the intersection of the chip face and the clearance face forms a cutting edge.

Bar peeling as a metal working operation means that a bar is axially displaced through a rotary cutter head, the cutter head provided with several tools arranged in circumferentially spaced apart relationship around the bar. The tools remove from the bar a thin layer of millscale, surface cracks, etc., that results from the hot rolling of such bars or tubes. In order to achieve the best results regarding tolerances and surface finish, two different types of inserts are usually combined in the same holder. German Document No. 35 40 665 discloses such tools equipped with a round roughing insert and a finishing insert usually having straight edges.

European Document No. 0 131 784 discloses a bar peeling tool with an insert having angularly broken (non-linear) edges. Such inserts, however, have somewhat limited utility because they do not enable desired results to be achieved in terms of tolerances and surface finish.

In view thereof, it is a purpose of this invention to provide a new type of insert and a tool which will satisfy close tolerance demands and enable very good surface finish to be achieved, while the insert will enable thick and thin chips to be separated from each other in a better way to achieve a shorter chip length when large feeds are involved, whilst reducing the risk of chip entanglement.

It is another purpose of the invention to provide an insert with an extended lifetime.

It is another purpose of the invention to provide an insert that becomes more economic due to the usage of only one type of insert.

It is yet another purpose of the invention to provide an insert which can more efficiently reduce and counter the tendency for vibrations to occur during a metal cutting operation.

SUMMARY OF THE INVENTION

The present invention relates to a cutting insert for bar peeling. The insert comprises a multi-cornered body having top and bottom surfaces and a peripheral edge surface extending therebetween. The peripheral edge surface includes corner faces disposed at respective corners of the body and intersecting the top surface to form main cutting edges therewith. Each corner face includes a curved portion of convex curvature as the insert is viewed from above. The curved portion intersects the top surface to form a curved portion of a respective cutting edge. The peripheral edge surface includes flat interconnecting portions each interconnecting a respective pair of the corner faces and intersecting the top surface to form a straight portion. The top surface defines a chip face including a chip former. The chip former comprises an elevated plateau. Portions of the plateau are disposed at respective corners. Each such plateau portion is configured to be non-symmetric with respect to a bisector of its respective corner and includes a downwardly extending side wall. A first portion of the side wall disposed on one side of the corner bisector is of concave shape as the insert is viewed from above. A second portion of the side wall disposed on an opposite side of the corner bisector is of convex shape as the insert is viewed from above.

BRIEF DESCRIPTION OF THE DRAWINGS

The invention will become apparent from the following detailed description of a preferred embodiment thereof in connection with the accompanying drawings.

DETAILED DESCRIPTION OF A PREFERRED EMBODIMENT OF THE INVENTION

Figure 1:
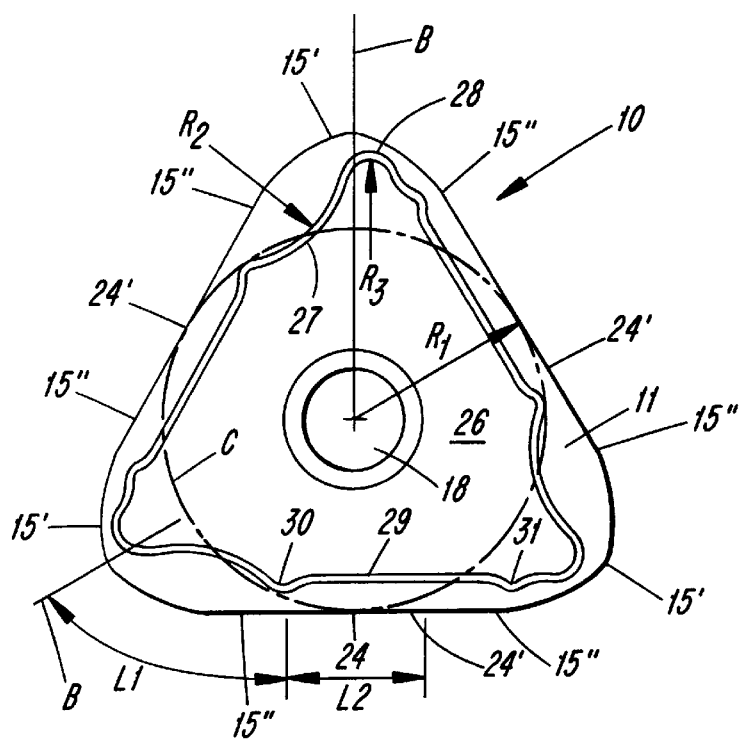
FIG. 1 is a plan view of an insert for bar peeling according to the invention.

An insert according to the invention shown in FIG. 1 comprises a polygonal body 10 formed of wear resistant material. The body 10 which includes an upper chip face 11, an opposite bottom face 12 that is parallel with the chip face 11, and a peripheral edge surface 13 located between the faces 11, 12. The intersection lines between chip face 11 and corner regions of said peripheral edge surface 13 represent main cutting edges 15, 16, 17. The peripheral edge surface is oriented substantially perpendicularly in relation to chip face 11 and bottom face 12. The insert body has a central aperture 18 which extends entirely through the insert body to receive a suitable clamping screw or lever arm of an associated tool holder 19.

Figure 2:
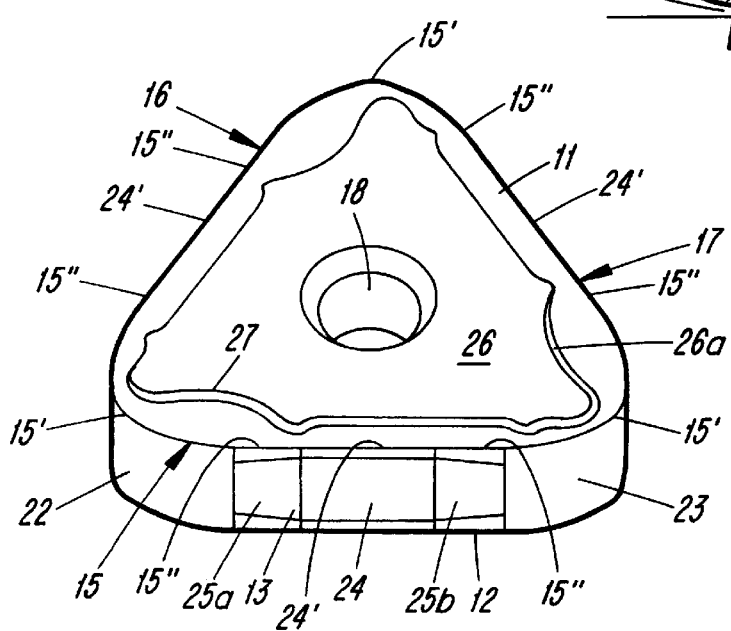
FIG. 2 is a perspective view of an insert for bar peeling according to the embodiment of FIG. 1.
Figure 3:
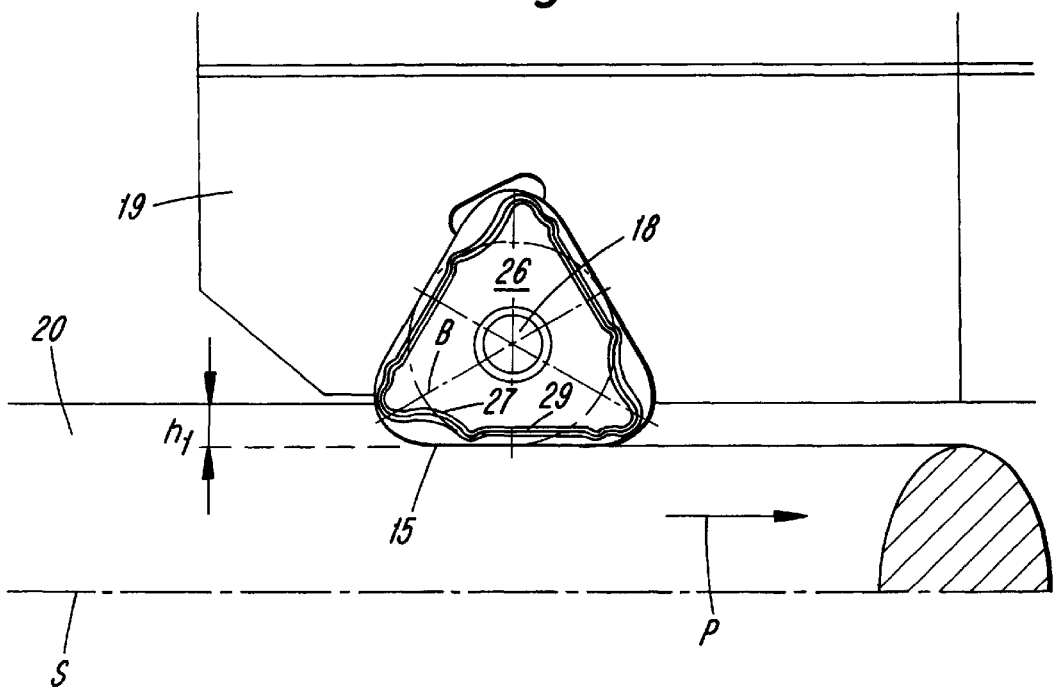
FIG. 3 is a plan view of a tool holder equipped with an insert according to the invention.

The insert is preferably triangular with three corner areas. Each corner area includes a convexly curved portion (convexly curved portions 22 and 23 being visible in FIG. 2) and a flat intermediate portion (flat intermediate portions 25a and 25b being visible in FIG. 2). The curved portion is of constant radius and intersects the top surface to form a convexly curved portion 15' of the main cutting edge 15 or 16 or 17. The flat intermediate portion 25a or 25b intersects the top surface 11 to form a straight portion 15' of each main cutting edge. In the tool holder 19 (shown in FIG. 3), the edge 15 is the insert's active edge that is engaged with the workpiece 20. Although the insert body 10 in this embodiment is provided with a central aperture 18 for the receipt of a central locking screw 21 it is to be understood that such insert could alternatively be solid and clamped into its holder 19 by means of a clamp body that is urged against the chip face of such insert body 10. The tool holder is intended to do active work whilst the workpiece 20 is simultaneously fed forward in the direction of arrow P to achieve cutting depth $h_1$. As a result of simultaneous turning of said workpiece about its center axis S, a chip is peeled from said workpiece whereby the main cutting edge 15 is active during said working.

Figure 2A:
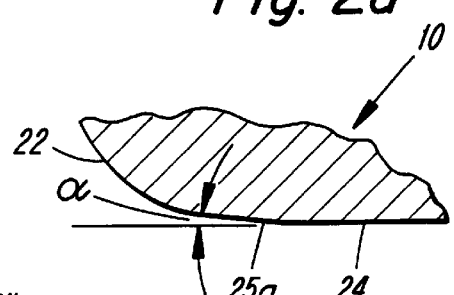
FIG. 2a is an enlarged fragmentary view of a portion of the cutting insert.

Adjacent ones of the insert corners are interconnected by flat interconnecting portions 24 of the peripheral edge surface. Each flat interconnecting portion 24 intersects the top surface 11 to form a straight edge 24'. Each surface 24 is intended to be a bevelled phase or a wiper aimed to generate a smooth surface in the axial direction of the workpiece 20. The longitudinal extension (i.e., its length in a direction parallel to the top surface 11) of the flat interconnecting portion 24 could vary. The size of the flat surface will depend upon the depth $h_1$ at which it is desirable to perform metalworking. Between said interconnecting portion 24 and two adjacent corners 22, 23 there are provided the shorter, flat intermediate surfaces 25a, 25b that are inclined inwards from the surface 24 towards the interior of the insert at an angle no greater than 2°, as shown in FIG. 2a. It is to be understood that the intersection line 15" between each said intermediate flat surface, 25a, 25b and the top surface 11 is effectively considered to be a portion of the main cutting edge 15, 16, or 17.

In order to achieve a desirable type of chipbreaking at various cutting depths a chip former is provided on the chip face at a certain distance from the cutting edges. The chip former is in the shape of a chipbreaking side wall 26a sloping downwards from an elevated plateau 26 arranged plane parallel with top and bottom surfaces 11, 12, said wall being inclined downwardly at an acute angle. More specifically, portions of the chipbreaking side wall are provided at the insert corners. Each such portion of the side wall constitutes a protrusion having a non-symmetrical configuration in relation to a bisector B passing through the respective corner. Hence, the inclined chipbreaking wall portion in each corner is composed of a concave portion 27 (having a large radius of curvature $R_2$) located on one side of the bisector B, and an adjacent convexly curved portion 28 located on the other side of the bisector B. The curved portion 28 has a radius of curvature $R_3$ that is essentially similar to radius $R_2$, said radius $R_3$ also being smaller than the radius of the curved edge surfaces 22, 23. The bisector B should preferably extend through the inflexion point defined as the point where the curved portions 27 and 28 join one another. Thanks to this arrangement there is provided a substantial space disposed close to the cutting edge 15 (see FIG. 2) such that a more curved chip can be obtained, due to the C-shaped configuration of said concave surface portion 27. A chip separation occurs due to the formation of the thick chip created at the corner, whereas a thinner chip is obtained by a wiper-effect along the surface portion 24. The total length of chip can thereby be shortened. The plateau 26 includes straight portions 29, the length of each portion 29 corresponding to the sum of the lengths of surface portions 24 and 25b. These straight portions 29 extend parallel to the flat surface portions 24. The longitudinal extension of straight portion 29 is confined by two convex surface portions 30, 31 each of which having a radius of curvature $R_4$ that is essentially smaller than the radius $R_3$ of the convexly curved portions 28.

The insert is preferable double-sided, whereby cutting edges identical to those described above are formed by the intersection of the peripheral edge surface with the bottom surface 12. On the bottom surface 12 of the insert, a plateau 26 (not shown) is provided which has, in relation to bisectors B, a reversed orientation as compared to that of FIG. 1. That is, the portion 28 of the bottom plateau will be situated beneath the portion 27 of the top plateau to provide support therefor. This means that the portion of the insert at the corner exposed to the largest cutting forces is given improved bottom support since the surface area of the bottom plateau at said corner will be located closer to the active cutting edge of the top surface. The amount of overhang will be smaller at the most sensible corner area of the insert, which will contribute to better strength, less tendency to vibrations and extended lifetime of the insert.

Tests carried out have shown that the relation of the effective length L1 of the main cutting edge, i.e., a part of the curved portion 15' extending from the bisector B plus the intermediate portion 15", should be 1.3–1.5 times the length L2 of the edge 24' defined by the interconnecting portion 24.

Figure 4:
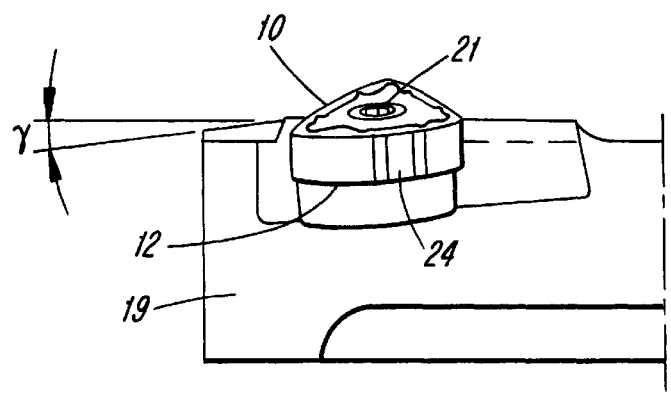
FIG. 4 is a side view of the tool holder and the insert of the invention.

In FIG. 4 there is illustrated how the insert 10 is obliquely oriented in its holder 19 to achieve a suitable clearance angle during working. The insert 10 is arranged such that it is inclined in relation to a horizontal plane extending through axis S at an angle γ not greater than 4°. At the same time, the insert is tilted forwardly at the same angle γ, i.e. it is inclined in a direction that is perpendicular from said first tilting direction. Although the invention is illustrated and described in the shape of an insert with negative basic shape, i.e., a shape in which the peripheral edge surface is oriented at a right angle to the upper chip face 11 and the lower face 12 it is to be understood that the invention is also applicable with positive inserts, i.e., a shape where the peripheral edge surface intersects the plane of the upper rake face 11 at an acute angle.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A cutting insert for bar peeling, the insert comprising a multi-cornered body having top and bottom surfaces and a peripheral edge surface extending therebetween, said peripheral edge surface including corner faces disposed at respective corners of said body and intersecting said top surface to form main cutting edges therewith, each corner face including a curved portion of convex curvature as said insert is viewed from above along a line of sight perpendicular to the top surface, each said curved portion intersecting said top surface to form a curved portion of a respective main cutting edge, said peripheral edge surface including flat interconnecting portions, each flat interconnecting portion interconnecting a respective pair of said corner faces and intersecting said top surface to form a straight edge, said top surface defining a chip face including a chip former, said chip former comprising an elevated plateau, corner portions of said plateau comprising protrusions disposed at respective ones of the corners, each protrusion being non-symmetric with respect to a corner bisector of the respective corner and including a downwardly extending side wall, said side wall of each protrusion including a first portion disposed on one side of said corner bisector and being of concave shape as said insert is viewed from above along a line of sight perpendicular to the top surface, and a second portion disposed on an opposite side of said corner bisector and being of convex shape as said insert is viewed from above along a line of sight perpendicular to the top surface, each of the first and second portions being in non-intersecting relationship with the peripheral edge surface.

2. The cutting insert according to claim 1 wherein a radius of curvature of said first side wall portion being larger than a radius of curvature of said second side wall portion.

3. The cutting insert according to claim 2, wherein said first and second side wall portions are joined at an inflexion point, said corner bisector passing through said inflexion point.

4. The cutting insert according to claim 3, wherein each corner face of said peripheral edge surface further includes two flat intermediate portions, each flat intermediate portion interconnecting one of said curved portions of one of said corner faces with one of said interconnecting portions, each intermediate portion being inclined from the respective interconnecting portion in a direction generally toward an interior of the insert.

5. The cutting insert according to claim 4, wherein a length of each intermediate portion in a direction parallel to an edge formed at the intersection of the adjacent interconnecting portion and said top surface is shorter than a corresponding length of a respective interconnecting portion.

6. The cutting insert according to claim 5, wherein an effective length of said main cutting edge of each corner face is 1.3 to 1.5 times a length of each interconnecting portion.

7. The cutting insert according to claim 6, wherein an included angle between said plateau and said side wall of said plateau is obtuse.

8. The cutting insert according to claim 7, wherein said side wall includes straight portions extending between adjacent insert corners, and a pair of convexly curved portions disposed at opposite ends of each of said straight portions.

9. The cutting insert according to claim 8, wherein said peripheral edge surface is oriented perpendicularly relative to said top and bottom surfaces and intersects said bottom surface to form main cutting edges therewith that correspond to said main cutting edges of said top surface, said bottom surface including a raised plateau which is a mirror image of said plateau of said top surface.

10. The cutting insert according to claim 1, wherein said first and second side wall portions are joined at an inflexion point, said corner bisector passing through said inflexion point.

11. The cutting insert according to claim 1, wherein an included angle between said plateau and said side wall of said plateau is obtuse.

12. The cutting insert according to claim 1, wherein said side wall includes straight portions extending between adjacent insert corners, and a pair of convexly curved portions disposed at opposite ends of each of said straight portions.

13. The cutting insert according to claim 1, wherein said peripheral edge surface is oriented perpendicularly relative to said top and bottom surfaces and intersects said bottom surface to form main cutting edges therewith that correspond to said main cutting edges of said top surface, said bottom surface including a raised plateau which is a mirror image of said plateau of said top surface.

14. The cutting insert according to claim 1, wherein each corner face of said peripheral edge surface further includes two flat intermediate portions, each flat intermediate portion interconnecting one of said curved portions of one of said corner faces with one of said interconnecting portions, each intermediate portion being inclined from the respective interconnecting portion in a direction generally toward an interior of the insert.

15. The cutting insert according to claim 1, wherein an effective length of said main cutting edge of each corner face is 1.3 to 1.5 times a length of each interconnecting portion.

* * * * *